(12) United States Patent
David et al.

(10) Patent No.: US 10,322,457 B2
(45) Date of Patent: Jun. 18, 2019

(54) CERAMIC MILLING CUTTER

(71) Applicant: SANDVIK INTELLECTUAL PROPERTY AB, Sandviken (SE)

(72) Inventors: Emmanuel David, Balbronn (SE); Camille Sandaldjian, Levallois-Perret (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 38 days.

(21) Appl. No.: 15/542,763

(22) PCT Filed: Dec. 21, 2015

(86) PCT No.: PCT/EP2015/080707
§ 371 (c)(1),
(2) Date: Jul. 11, 2017

(87) PCT Pub. No.: WO2016/113078
PCT Pub. Date: Jul. 21, 2016

(65) Prior Publication Data
US 2018/0009043 A1 Jan. 11, 2018

(30) Foreign Application Priority Data
Jan. 12, 2015 (EP) .................................... 15150825

(51) Int. Cl.
*B23C 5/00* (2006.01)
*B23C 5/10* (2006.01)
(Continued)

(52) U.S. Cl.
CPC .............. *B23C 5/10* (2013.01); *C04B 37/026* (2013.01); *B23C 5/006* (2013.01); *B23C 5/18* (2013.01);
(Continued)

(58) Field of Classification Search
CPC ......... B23B 51/02; B23B 5/10; B23B 5/1009; B23B 27/16; B23C 5/10; B23C 5/1009
See application file for complete search history.

(56) References Cited

U.S. PATENT DOCUMENTS 5,909,985 A * 6/1999 Shiga .................. B23B 51/0009
408/1 R
6,312,201 B1 * 11/2001 Nagaya ................. B23B 27/007
279/103
(Continued)

FOREIGN PATENT DOCUMENTS

DE 102009034202 B3 9/2010
DE 102012218702 A1 4/2014
(Continued)

*Primary Examiner* — Willmon Fridie, Jr.
(74) *Attorney, Agent, or Firm* — Corinne R. Gorski

(57) ABSTRACT

A milling device is rotatable in one direction around a longitudinal center axis defining a forward direction and an opposite rearward direction, and includes a front part and a rear part. The front part has cutting edges, each having a longitudinal extension, and chip flutes, each having a longitudinal extension. The front part is made of a monolithic piece of ceramic. The rear part is configured to be fixed in a rotatable tool body or a rotatable chuck. The rear part is also made of a monolithic piece of cemented carbide. A front end surface of the rear part has a smaller area than a rear end surface of the front part. The front end surface of the rear part and a rear end surface of the front part are permanently bonded or brazed to each other by a joint.

1 Claim, 2 Drawing Sheets

(51) Int. Cl.
  *B23C 5/18* (2006.01)
  *C04B 37/02* (2006.01)
(52) U.S. Cl.
  CPC ...... *B23C 2210/02* (2013.01); *B23C 2210/03* (2013.01); *B23C 2222/28* (2013.01); *B23C 2226/18* (2013.01); *B23C 2240/08* (2013.01); *B23C 2240/32* (2013.01); *C04B 2237/125* (2013.01); *C04B 2237/126* (2013.01); *C04B 2237/127* (2013.01); *C04B 2237/343* (2013.01); *C04B 2237/368* (2013.01); *C04B 2237/401* (2013.01); *C04B 2237/76* (2013.01); *C04B 2237/86* (2013.01)

(56) References Cited

U.S. PATENT DOCUMENTS

| | | | | |
|---|---|---|---|---|
| 7,785,700 | B2* | 8/2010 | Okada | B23B 51/06 428/216 |
| 8,647,025 | B2* | 2/2014 | Davis | B23C 5/10 407/54 |
| 9,434,034 | B2* | 9/2016 | Nam | B23P 15/32 |
| 9,868,162 | B2* | 1/2018 | Maeda | B23C 5/10 |
| 2006/0072977 | A1* | 4/2006 | Jonsson | B23B 31/1107 408/233 |
| 2008/0101878 | A1* | 5/2008 | Skilberg | B23B 31/11 407/54 |
| 2009/0060663 | A1 | 3/2009 | Rouge et al. | |
| 2010/0290845 | A1* | 11/2010 | Shimoda | B22F 7/062 407/32 |
| 2013/0051935 | A1* | 2/2013 | Schuffenhauer | B23B 31/1107 407/34 |
| 2014/0212233 | A1 | 7/2014 | Park et al. | |
| 2014/0294528 | A1* | 10/2014 | Azegami | B23C 5/10 408/200 |
| 2014/0308082 | A1* | 10/2014 | Abe | B23B 31/1122 407/37 |
| 2015/0030399 | A1* | 1/2015 | Frota de Souza | B23C 5/10 407/33 |
| 2015/0314379 | A1* | 11/2015 | Sharivker | B23C 5/10 407/34 |
| 2015/0360295 | A1* | 12/2015 | Haimer | B23B 31/1115 279/20 |
| 2017/0291230 | A1* | 10/2017 | Harpaz | B23C 5/10 |
| 2018/0243845 | A1* | 8/2018 | Funke | B23B 31/005 |

FOREIGN PATENT DOCUMENTS

| | | |
|---|---|---|
| EP | 0477093 A1 | 3/1992 |
| EP | 2167263 B1 | 10/2012 |
| WO | 02/076661 A1 | 10/2002 |

* cited by examiner

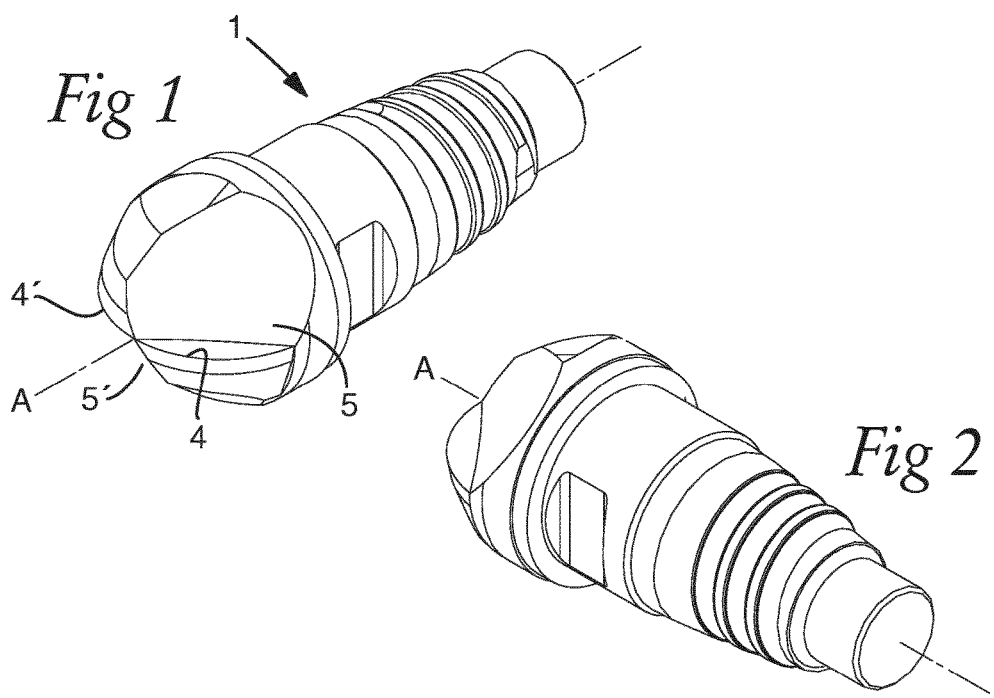
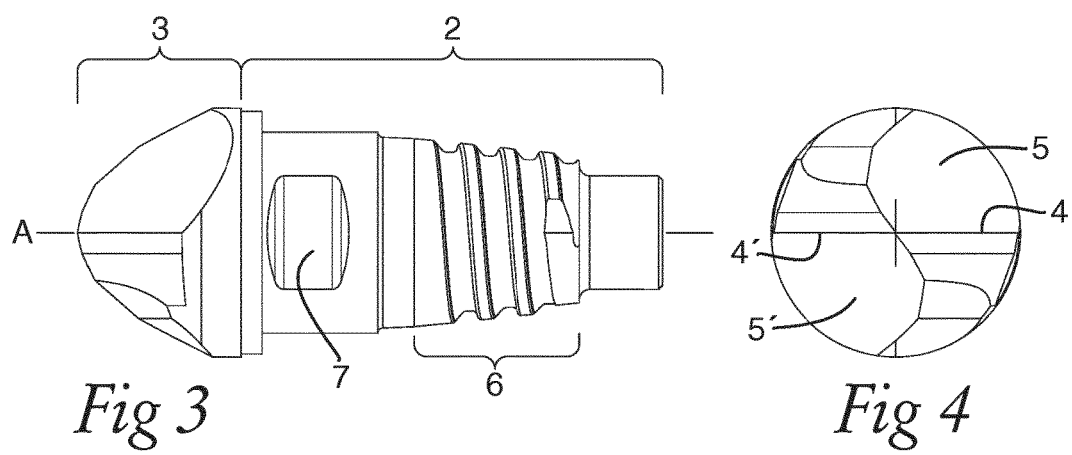
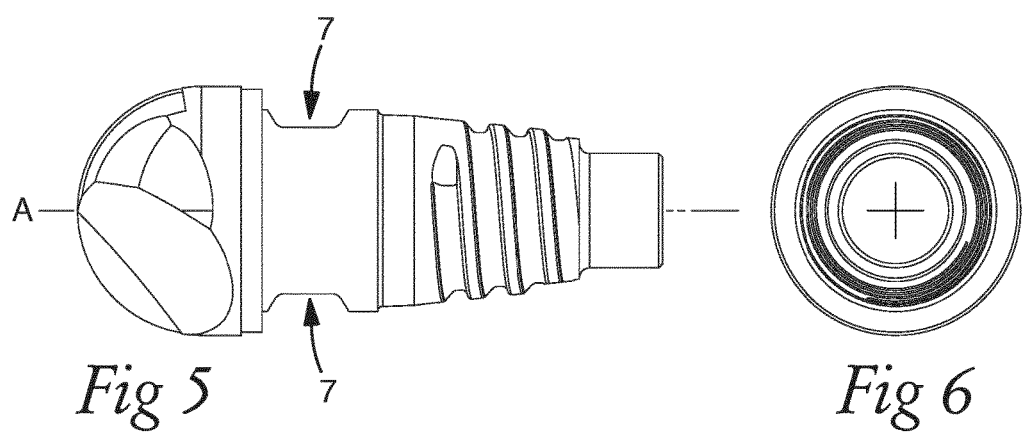

CERAMIC MILLING CUTTER

RELATED APPLICATION DATA

This application is a § 371 National Stage Application of PCT International Application No. PCT/EP2015/080707 filed Dec. 21, 2015 claiming priority of EP Application No. 15150825.6, filed Jan. 12, 2015.

BACKGROUND OF THE INVENTION AND PRIOR ART

The present invention relates to a milling device and a milling tool having such a milling device, and to a method to produce such a milling device.

For metal cutting tools, many cutting tool materials, i.e. the material of the cutting edges of the cutting tools, are known. Cutting tool materials are arranged in separate and distinct groups of materials, such as high speed steel, cemented carbide, ceramics, cubic boron nitride and diamond. These materials are of different chemical compositions, and have different characteristics and properties, especially relating to toughness and hardness, especially at the high temperatures at or near the cutting edge during cutting.

One aim of past and present cutting tool material development is to develop materials with both high toughness and high hardness. However, so far the choice of cutting tool material is always a compromise between toughness and hardness.

Ceramics or ceramic materials are very hard and heat resistant, more so than cemented carbide, and are therefore useful in high cutting speed metal cutting. An important advantage for ceramics is their stability at elevated temperatures. Cubic boron nitride is harder than ceramic, but has the drawback of being more expensive than ceramic. Compared to cemented carbide, ceramics are less tough, which means that they are more brittle or more fragile and have less bending strength. Ceramics may be either alumina-based or silicon-based or silicon nitride-based, or a mix of these. They may be reinforced by "whiskers". Common types of ceramics include $Al_2O_3$, $Si_3N_4$ and SiAlON.

In certain metal cutting, or machining, operations, such as milling of deep pockets or cavities in a work piece made from a heat resistant super alloy (HRSA), there is a need for a milling tool or milling device which is long and slender, capable of low wear of the cutting edges at high cutting speed, predictable tool life, and high precision i.e. small geometrical deviations on the machined component. Ideally such milling tool or milling device has low production cost and/or few manufacturing steps.

Known milling tools or milling devices for such machining operations include end mills, exchangeable head milling cutters, and milling cutters with flat-shaped inserts.

End mills are normally monolithic bodies of cylindrical shape, which are clamped in chucks. End mills may be made from various materials, cemented carbide is a common choice. U.S. Pat. No. 8,647,025 discloses an end mill which is made from a monolithic piece of ceramic material.

Exchangeable head milling cutters comprise a front exchangeable head with cutting edges which at its rear is mounted in a tool. One way to mount such an exchangeable head in a tool is through mating threads. Such a device is shown in EP2167263B1, where the exchangeable head is made from a monolithic piece of cemented carbide.

SUMMARY OF THE INVENTION

An object of the present invention is to provide a milling device which can be used to cut deep pockets in a metallic work piece at high cutting speed with a ceramic cutting edge with an improved tool life. A secondary object is to provide a milling device which can manufactured in a cost-effective way. At least one of the above objects is achieved by a milling device rotatable in one direction around a longitudinal center axis (A) defining a forward direction and an opposite rearward direction, comprising a front part and a rear part, the front part comprising cutting edges each having a longitudinal extension, the front part comprising chip flutes each having a longitudinal extension, the front part is made of a monolithic piece of ceramic, the rear part is configured to be fixed in a rotatable tool body or a rotatable chuck, characterized in that the rear part is made of a monolithic piece of cemented carbide, a front end surface of the rear part having a smaller area than a rear end surface of the front part, the front end surface of the rear part and a rear end surface of the front part being permanently bonded or brazed to each other by a joint.

By such a milling device, which comprise a ceramic front part and a cemented carbide rear part, long tool life of the cutting edges can be achieved while also permitting a certain amount of bending of the milling device before breakage, during operation or machining or cutting, when the milling device rotates around its longitudinal center axis. In other words, resistance to breakage or crack initiation in a part of the milling device at a relatively large (10-100 mm) distance from the cutting edges is increased compared to the end mill disclosed in U.S. Pat. No. 8,647,025. This improvement is because of the higher toughness of cemented carbide compared to ceramic. Such a milling device also has a reduced risk of being subject to undesired vibrations during cutting, which can give chatter marks on the machined surface. This reduced risk is because of the higher density of the cemented carbide, compared to ceramic. Such a milling device also has a strong joint because the high temperature during metal cutting is at or near the active cutting edges, which are located at a relatively large distance from the joint. Therefore, the temperature increase of the joint during cutting will be relatively low. Such a milling device also have a reduced material cost compared to a solid ceramic milling device because only the front part is made from the more expensive ceramic material, while the rear part is made from the less expensive cemented carbide material. Such a milling device also have a relatively low production cost, because only one joint is necessary regardless of the number of cutting edges. The ceramic front part is preferably ground, such that the center of mass thereof is located at the longitudinal center axis. The ceramic front part preferably comprises 2-6 cutting edges. All cutting edges of the milling device are formed in the same monolithic piece of ceramic. The longitudinal center axis is a rotational axis of the milling device. The milling device is suitable during machining or metal cutting to be rotated in one direction around the longitudinal center axis. Each cutting edge has an associated chip flute. The rear part made of cemented carbide is preferably made from sintered cemented carbide comprising 80-95 volume % WC and 5-20 volume % Co. The ceramic front part and the cemented carbide rear part are permanently bonded or brazed to each other by a joint. The joint must have sufficient strength. One suitable example to achieve such joint is by brazing using active silver brazing filler metal. Brazing is a process to join two parts where a filler metal is heated to a temperature where the filler metal melts. After cooling, the parts are permanently bonded. The joint may also be glue, which can be used to achieve to permanent bond. The milling device can be in the form of an end mill, i.e. comprising a cylindrical rear part suitable to be fixed by a chuck, e.g. a hydraulic chuck. After use, the end mill can be removed from the chuck. The milling device can also be in the form of an exchangeable head milling cutter, i.e. a part of a tool which is fixed at a front end of a rotatable tool body by means of e.g. corresponding threads. After use, the exchangeable head milling cutter can be removed from the rotatable tool. The milling device has a diameter which preferably is 5-40 mm. The front end surface of the rear part has a smaller area than the rear end surface of the front part, when the surfaces are projected on a plane perpendicular to the longitudinal center axis. The front end surface of the rear part and the rear end surface of the front part preferably have corresponding shapes. One such arrangement is where the front end surface of the rear part and the rear end surface of the front part both are flat and perpendicular to the longitudinal center axis (A). One other such arrangement is where the front end surface of the rear part includes a ridge and the rear end surface of the front part includes a groove.

According to one embodiment, the rear part comprises a thread for fixing the milling device in a corresponding thread in a rotatable tool body, wherein the rear part comprises radially external grip surfaces for being engaged by a key or wrench when fixing the milling device in and releasing the milling device from the tool body through a rotational movement, and wherein the grip surfaces being formed between the thread and the front end surface of the rear part. With such an arrangement, the milling device can easily be removed after use. It can be used in rotatable tools of different length and shape. Preferably, the grip surfaces are located opposite each other. Preferably, the grip surfaces are flat. Preferably, the grip surfaces are flat bottom surfaces of opposite cavities.

According to one embodiment, the cutting edges and the chip flutes are formed by grinding, wherein the grip surfaces are formed by pressing and sintering, and wherein the thread is formed by grinding. Such a milling device is relatively inexpensive to produce, because no subsequent grinding is done when forming the grip surfaces.

According to one embodiment, the rear end surface of the front part and the front end surface of the rear part are perpendicular to the longitudinal center axis (A). Such a milling device also have a relatively low production cost because flat surfaces perpendicular to the longitudinal center axis are relatively easy to produce, for example by a grinding operation.

According to one embodiment, the longitudinally rear end surface of the front part being a circular surface concentric with the longitudinal center axis, wherein the front end surface of the rear part being a circular surface concentric with the longitudinal center axis. By such a milling device the joint can have a relatively large area and can therefore be stronger. A circular shape has been found to be suitable for rotatable tools.

According to one embodiment, the longitudinally rear end surface of the front part extends a greater distance from the longitudinal center axis than front end surface of the rear part.

According to one embodiment, the front part has a maximum radial distance from the longitudinal center axis (A) which is greater than the maximum radial distance from the longitudinal center axis (A) to the rear part periphery. By such a milling device the accessibility when machining deep pockets is improved. In other words, the rear part do not risk being in contact with the component to be machined. Also there is less risk of the rear part, which is made from a less wear resistant material than the front part, being damaged by chips during cutting.

According to one embodiment, the chip flutes have rear end points which are located in the front part at a longitudinal distance from the joint. By such a milling device, the strength of the joint can be improved because the area of the rear end surface of the front part is greater when the chip flutes ends in the front part at a distance from the rear end surface of the front part. This is because that a chip flute is a cavity or a cut out, i.e. a space for chips where a piece of material has been removed from the front part, and thereby the area of the front part perpendicular to the longitudinal center axis (A) is reduced in the presence of a chip flute. By such a milling device, there is less risk that chips become in contact with the rear part, which is made of cemented carbide which is less wear resistant to abrasive wear caused by chips. Preferably the chip flutes has a depth which decreases to zero depth in the direction towards the joint.

According to one embodiment, the chip flutes have longitudinal rear end points which are located longitudinally closer to the joint than longitudinal rear end points of the cutting edges. By such a milling device chip evacuation is improved, because it is usually desirable to have chips which flow in a longitudinally rearward direction which is usually away from the active cutting zone.

According to one embodiment, the cutting edges are shaped as arches of circles having equal radii, wherein the cutting edges are arranged symmetrically arranged around the longitudinal center axis (A), wherein front end points of the cutting edges being located at the longitudinal center axis (A) at the same distance from the joint. Such a milling device is suitable for profile milling, or an operation where the feed direction of the milling device is in a direction perpendicular to the longitudinal center axis. In such an operation, the part of the cutting edges closest to the longitudinal center axis are active during the cutting process independent of the depth of cut, and temperature rise at the joint is relatively low because of the ceramic material which has a low thermal conductivity. The distance from the joint to the front end points of the cutting edges are relatively large, which reduces the temperature rise of the joint, and therefore increases the strength of the joint during cutting. Such a milling device has reduced resistance to notch wear which is a dominating wear mechanism of cutting edges when machining heat resistant super alloys (HRSA), especially Ni-based super alloys.

According to one embodiment, the front part is made of Al2O3, Si3N4 or SiAlON. By such a milling device the front part has been found to have a long tool life at high cutting speed, especially in heat resistant super alloys. SiAlON, which is Silicon+Aluminum+Oxygen+Nitrogen, is a preferred ceramic for machining heat resistant super alloys based on Ni (Nickel). SiAlON is based on Silicon Nitride (Si3N4) and Aluminum oxide (Al2O3).

According to one embodiment the joint comprise a solder, the solder comprise 58-62 wt. % Ag, 23-25 wt. % Cu, 13-13 wt. % In and 1.5-2.5 wt. % Ti. A solder is a fusible metal alloy. By such a milling device the joint between ceramic and cemented carbide has been found to give improved joint strength. Preferably, the joint is made by using the active silver brazing filler metal "TB-629T" from Tokyo Braze Co Ltd.

According to one embodiment the joint comprise a solder, the solder comprises 55-60 wt. % Ag, 25-30 wt. % Cu, and 1-2 wt. % Ti. By such a milling device the joint between ceramic and cemented carbide has been found to give improved joint strength.

According to one embodiment, a milling tool comprise a milling device and rotatable tool body, the rotatable tool body comprising thread corresponding to the thread of the milling device, the rotatable tool body being made of steel, the thread of the rotatable tool body being an internal thread, the thread of the milling device being an external thread. By such a milling device the milling device is relatively easy to produce, compared to if the internal thread was formed in the rear part.

According to one embodiment, a method to produce a milling device comprise the steps of supplying a rear part being made of a monolithic piece of cemented carbide, the rear part having a longitudinal center axis defining a forward direction and an opposite rearward direction, grinding the longitudinally front end surface of the rear part, blasting the front end surface of the rear part, cleaning the longitudinally front end surface of the rear part, supplying a cylindrically shaped front part made of a monolithic piece of ceramic having a circular surface defining a rear end surface of the front part, the area of the rear end surface of the front part being greater than area of the front end surface of the rear part, cleaning the rear end surface of the front part, placing the front part such that the longitudinal center axis (A) is in a vertical position, applying an active silver brazing filler metal on the front end surface of the rear part, positioning the front end surface of the rear part against the rear end surface of the front part, heating the front part, the rear part and the filler material to a temperature of 140-160° C. in 8-12 minutes, heating the front part, the rear part and the filler material to a temperature of 740-760° C. in 22-26 minutes, grinding the front part in such a way that cutting edges and chip flutes are formed in the front part. Such a milling device also have a relatively low production cost because the cylindrical ceramic front part when joining the front and read parts do not have to have a perfect alignment with the cemented carbide rear part. In other words, a center axis of the cylindrical ceramic front part does not have to coincide with a center axis of the cemented carbide rear part when joining the parts.

BRIEF DESCRIPTION OF THE DRAWINGS

FIG. 1 is a perspective view of a milling device according to a first embodiment of the invention.

FIG. 2 is another perspective view of the milling device in FIG. 1.

FIG. 3 is side view of the milling device in FIG. 1.

FIG. 4 is a front view of the milling device in FIG. 1.

FIG. 5 is top view of the milling device in FIG. 1.

FIG. 6 is rear view of the milling device in FIG. 1.

DETAILED DESCRIPTION OF DIFFERENT EMBODIMENTS

Figure 7:
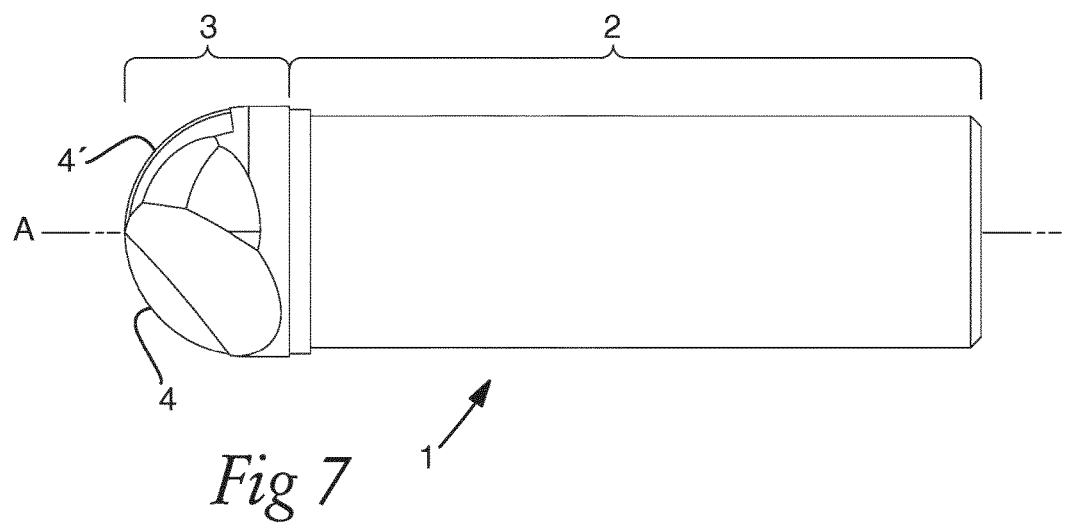
FIG. 7 is a side view of a milling device according to a second embodiment of the invention.

FIGS. 1-6 show a milling device (1) according to a first embodiment, which show an exchangeable head type of milling device (1). The milling device (1) is rotatable in one direction around a longitudinal center axis (A) defining a forward or front direction and an opposite rearward or rear direction. The milling device (1) comprises a front part (3) and a rear part (2) which are bonded or brazed to each other by a joint. As can be seen in FIG. 3, the front part (3) extends only in the forward or front direction relative to the joint, and the rear part (2) extends only in the opposite direction relative to the joint, which is the rearward or rear direction.

Further away than the rear part (2) in the rear or rearward direction is a rotating machine tool spindle (not shown), which is part of a machine tool such as a machining center or other CNC-machine (not shown). The milling device (1) can be connected to the rotating machine tool spindle by at least a rotatable tool body (not shown). The milling device is for machining metal work pieces, such as steel based or Ni-based materials. The front part (3) of the milling device (1) comprises two cutting edges (4, 4') each having a longitudinal extension of equal length. The two cutting edges (4, 4') each has a radial extension of equal length, which length extends from the longitudinal center axis (A) to a maximum radial dimension of the milling device (1). In other words, no part of the milling device (1) extends a larger radial distance from the longitudinal center axis (A) than the part of the cutting edges (4, 4') which has the largest radial distance from the longitudinal center axis (A). Each cutting edge (4, 4') has a shape which is an arch of a circle, more specifically a quarter of a circle. The cutting edges (4, 4') are oriented opposite each other, in such a way that in a front view, as can be seen in FIG. 4, the cutting edges (4, 4') form an angle of 180° relative to each other. Normal vectors of the rake faces adjoining each cutting edge (4, 4') are directed in opposite directions. Adjoining each cutting edge (4, 4') is a chip flute (5, 5') in the form of a cut-out or a cavity, which has a longitudinal extension. The chip flute (5, 5') is a space in which a chip can form and move after being formed. During cutting, the cutting edge (4, 4') forms a chip which will form chips which will come into contact with the rake face and the bottom of the chip flute (5, 5'). The cutting will generate a rise of temperature of the milling device (1). The highest temperature will be located at or in the vicinity (<1 mm distance) of the cutting edge (4, 4'). The contact with a moving chip will generate abrasive wear. The front part (3) is made of one monolithic piece of ceramic. Al2O3, Si3N4, SiAlON or a mix of these materials are examples of suitable ceramics. The ceramic may be whisker reinforced. Cubic boron nitride (CBN), diamond, cemented carbide, cermet and high-speed steel (HSS) are examples of materials which is not ceramic in the meaning of this document. All external surfaces of the front part (3) are formed by grinding. The front part (3) has a front end, where the cutting edges (4, 4') meet at the longitudinal center axis (A), and an opposite rear end which is in the form of a circle concentric with and perpendicular to the longitudinal center axis (A). The rear end of the front part (3) is permanently bonded or brazed to the front end of the rear part (2). The rear part (2) comprise flat radially external grip surfaces (7) oriented opposite each other, as can be seen in FIG. 5. When the milling device (1) is to be mounted or fixed in a seat in a rotatable tool body (not shown), a key or wrench (not shown) which has surfaces which is positioned against the grip surfaces (7) is turned in one direction, which causes a rotation of the milling device (1). The thread (6) has a corresponding thread in a rotatable tool body (not shown). The grip surfaces (7) are located between the thread (6) and the front end surface of the rear part (2). The front end of the rear part (2) is in the form of a surface which is perpendicular to the longitudinal center axis (A). The rear part (2) is made of a monolithic piece of cemented carbide, preferably comprising 80-95 volume % WC and 5-20 volume % Co, which is sintered after pressing. As can be seen in FIG. 3 and FIG. 5, there is a step at the joint. In other words, at the joint the rear end surface of the front part (3) extends a larger radial distance than the front end surface of the rear part (2) in such a way that a radial step is formed. The step has a length of 0.1-5 mm. The longitudinal extension of the rear part (2) is 8-30 mm. The longitudinal extension of the front part (3) is 20-60% of the longitudinal extension of the rear part (2). The maximum diameter of the front part (3) is 8-40 mm. The maximum diameter of the rear part (2) is 80-99.5% of the maximum diameter of the front part (3).

Figure 8:
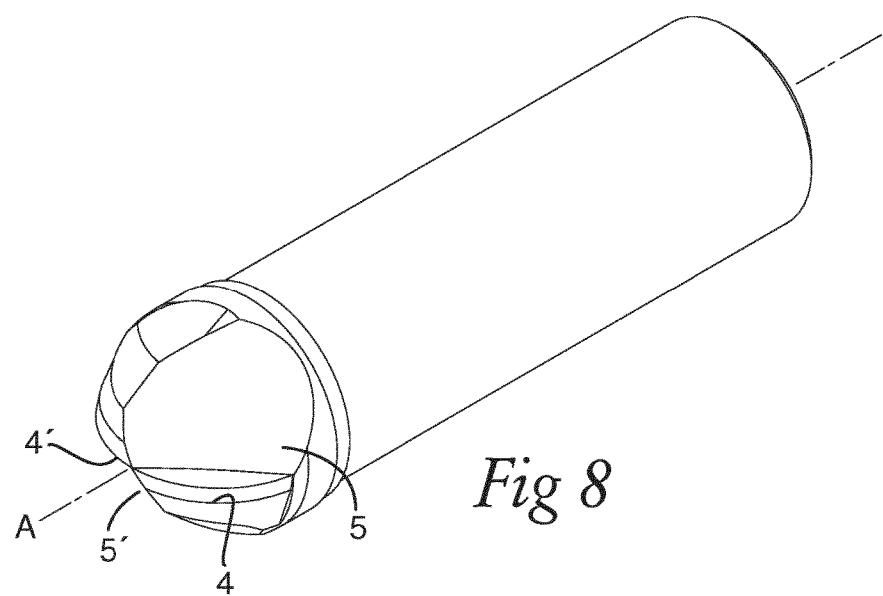
FIG. 8 is a perspective view of the milling device in FIG. 7.

FIGS. 7-8 show a milling device (1) according to a second embodiment, in the form of an end mill. It has a front part (3) which is identical to the front part (3) according to the first embodiment. Additionally, the joint and the front end of the rear part (2) are also identical to the first embodiment. The rear part (2) has the shape of a circular cylinder. The milling device (1) can be located in a cavity of e.g. a hydraulic chuck (not shown), and clamped therein by a hydraulic pressure. Additional arrangements are possible, such as a helical groove in the radial surface of the radial surface which mates with pull out preventing means inside the cavity of the hydraulic chuck. The longitudinal extension of the rear part (2) according to the second embodiment is 50-150 mm. All other properties are identical to the milling device (1) according to the first embodiment.

The milling device (1) according to the first embodiment is produced according to the following method. A rear part (2) being made of a monolithic piece of cemented carbide is supplied, the rear part (2) having a longitudinal center axis (A) defining a forward direction and an opposite rearward direction. The grip surfaces (7) are formed solely by pressing and sintering. The thread (6) is by formed by pressing and sintering with a subsequent grinding operation. The longitudinally front end surface of the rear part (2) is ground in such a way that a front end surface of the rear part (2) which is perpendicular to the longitudinal center axis (A) is formed. The front end is blasted and cleaned with an alcohol. A cylindrically shaped front part (3) made of a monolithic piece of ceramic in the form of SiAlON having a circular surface defining a rear end surface of the front part (3) is supplied. The area of the rear end surface of the front part (3) is greater than area of the front end surface of the rear part (2). The rear end surface of the front part (3) is cleaned with an alcohol. The front part (2) is placed such that the longitudinal center axis (A) is in a vertical position. A paste in the form of active silver brazing filler metal is applied on the front end surface of the rear part (2). The active silver brazing filler metal comprise 58-62 wt. % Ag, 23-25 wt. % Cu, 13-13 wt. % In and 1.5-2.5 wt. % Ti. The trade name is "TB-629T" from the company Tokyo Braze Co Ltd. The front end surface of the rear part (2) is positioned against the rear end surface of the front part (3). Because the front part (3) has a larger rear end surface, the positioning does not need to be absolutely accurate. In other words, the longitudinal center axis of the front part (3) and the rear part (2) do not have to coincide. They only need to be parallel. The milling device (1), i.e. the front part (3), the rear part (2) and the filler material, is pre-heated in an environment of 140-160° C. for a time of 8-12 minutes. The front part (3) and the rear part (2) is then brazed to each other by heating the milling device (1) in an environment of a temperature of 740-760° C. in 22-26 minutes. Hereby the front part (3) and rear part (2) are permanently bonded to each other. After this, the front part (3) is ground in such a way that cutting edges (4, 4') and chip flutes (5, 5') are formed in the front part (2). Also, additional material of the front part (3) is ground such that the center of mass of the front part (3) is located at the longitudinal center axis (A).

The milling device (1) according to the second embodiment is produced in a similar way as the milling device according to the first embodiment. The difference is that that the rear part (2) supplied has a cylindrical shape. It does not comprise grip surfaces or thread.

The invention claimed is:

1. A method to produce a milling device, comprising the steps of:
    supplying a rear part of the milling device, the rear part being made of a monolithic piece of cemented carbide, the rear part having a longitudinal center axis defining a forward direction and an opposite rearward direction
    grinding a longitudinal front end surface of the rear part;
    blasting the front end surface of the rear part;
    cleaning the longitudinal front end surface of the rear part;
    supplying a cylindrically shaped front part made of a monolithic piece of ceramic having a circular surface defining a rear end surface of the front part, an area of the rear end surface of the front part being greater than an area of the front end surface of the rear part;
    cleaning the rear end surface of the front part;
    placing the front part such that the longitudinal center axis is in a vertical position;
    applying an active silver brazing filler metal on the front end surface of the rear part;
    positioning the front end surface of the rear part against the rear end surface of the front part;
    heating the front part, the rear part and the filler material to a temperature of 140-160° C. for 8-12 minutes;
    heating the front part, the rear part and the filler material to a temperature of 740-760° C. for 22-26 minutes; and
    grinding the front part in such a way that cutting edges and chip flutes are formed in the front part.

* * * * *